C. N. POUNDSTONE.
Rotary Cultivators.

No. 135,664.　　　　　　　　　　　　　　　Patented Feb. 11, 1873.

(The best mode of use.)

Hill of corn.
(another usage.)

Witnesses
Henry W. Wells
James M. Morse.

Charles N. Poundstone
by Edmund Thurlow
his Atty in fact.

UNITED STATES PATENT OFFICE.

CHARLES N. POUNDSTONE, OF LIVONIA, ILLINOIS.

IMPROVEMENT IN ROTARY CULTIVATORS.

Specification forming part of Letters Patent No. 135,664, dated February 11, 1873.

*To all whom it may concern:*

Be it known that I, CHARLES N. POUNDSTONE, of Livonia, in the county of La Salle, and in the State of Illinois, have invented a Rotary Cultivator; and do hereby declare that the following is a full, clear, and exact description thereof, reference being had to the annexed drawing making a part of this specification, in which like letters of reference refer to like parts, and in which—

Figure 1:
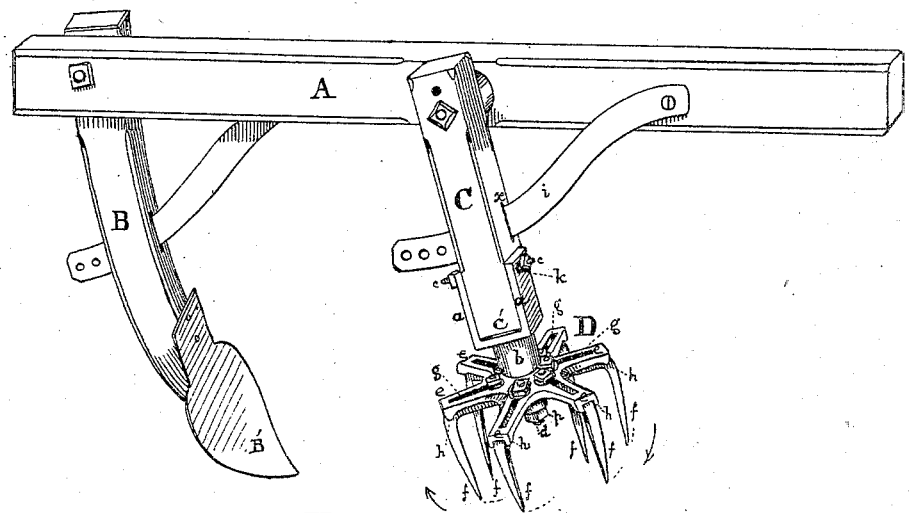
Figure 2:
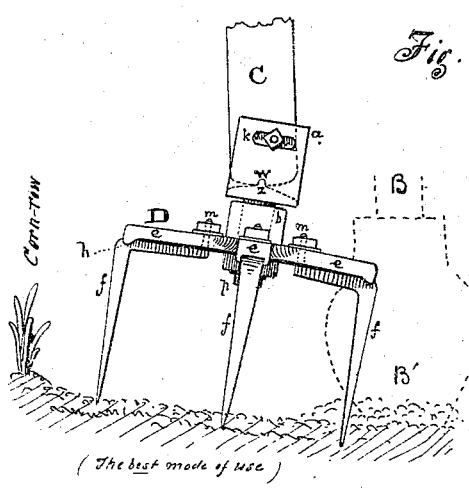
Figure 3:
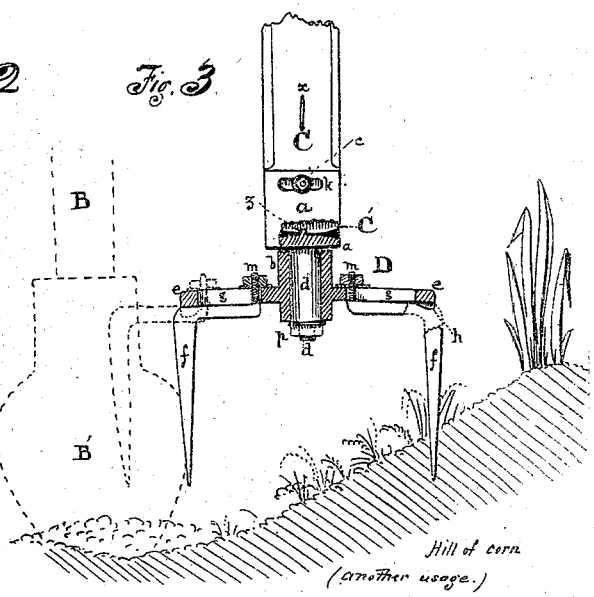

Figure 1 represents a perspective view; Fig. 2, a front elevation of the rotatory wheel at work; Fig. 3, front elevation, partly sectional, of a second mode of working the wheel or cultivator.

This invention may be called a rotatory-cultivator attachment to "straddle-row corn-cultivators," and is principally designed for cultivating small plantations or grounds; and consists of a small horizontal wheel carrying several vertical extensible teeth, and attached near the ground to the end of a standard depending from the cultivator-beam. The wheel is inclined and rotated by the striking of the teeth in the soil on one side more deeply than on the other side, and is followed, at pleasure, by a common shovel-plow to return the pulverized soil to the side of the stirred hill.

The drawing represents the best, or one of the usual, forms of my rotary cultivator.

A in the same represents the cultivator-beam; B, one of the attached shovels; C, the standard or stem of the rotatory cultivator, made adjustable at different heights on the beam A by the usual bolt, and adjustable at various angles toward the front or rear by means of the stay $i$ attached above to the beam A, and passing through a slot, $x$, in said stem or similar contrivance where a pin through either of the holes in the lower end of said brace holds the stem at the required angle. The latter terminates in an iron shoe, $a\ a$, having a spindle, $d$, projecting from its lower surface vertically, which carries the hub $b$ of the horizontal wheel D, the latter being held in place by a "washer" and "nut," $p$. Said shoe is provided with a horizontal slot, $k$, in front and rear, through which the stationary bolt $c$ in the stem A passes, and which is fitted with a nut at one end, which arrangement is for "canting" or inclining the shoe and wheel, as hereinafter described. The end C' of the stem is pivoted on the rib $z$ projecting from the interior surface of the shoe $a$, which rib is in a line parallel with the plow-beam. Said stem is provided in its lower end with a corresponding recess to receive the rib. D is an iron wheel about twelve inches in diameter, having several arms, $e\ e$, &c., radiating horizontally from the hub $b$, which turns upon the spindle $d$ of the stem C. Each arm is slotted longitudinally at $g\ g$, &c., and have lugs $h\ h$ on either side of their extremities, on their under sides, between which the horizontal arm of one of the attached vertical teeth $f$, respectively, are retained. The teeth $f\ f\ f$, &c., have each a vertical prong terminating above in a horizontal arm, which passes through or between the lugs $h\ h$ and afterward is bent at a right angle, and passes through the slot $g$, and terminates in a thread and nut above the surface of the arm $e$, by which to adjust the teeth at different distances from the hub, so as to cultivate or stir a narrower or broader strip of soil in the progress of the machine. The stem C and its attachments may be adjusted to any cultivator, substituting the same and its rotary wheel for all or part of the shovels on the same, or the rotary wheel D and its accompanying attachments may be used, one on either side of a corn-hill and followed by a shovel, B'.

The operation of this invention is as follows, viz: The rotary toothed wheel $b$ D $e\ f$ is attached, by means of the shoe $a\ a$ and stem C and brace $i$ or equivalent means, to the cultivator-beam (of any cultivating-machine appropriate for the purpose) in front of the shovel or shovels, or it may substitute all the shovels and be effective in its operation, and one or more rotary wheels may pass on each side of the corn-row at one operation with great advantage. The wheel D is slightly inclined from horizontal and from the corn-hill, so that the outer teeth or those most distant from the hill are deepest in the soil, the teeth revolving outward from the hill in front. By adjusting the shoe $a\ a$ by means of the slot $k$ and bolt $c$, the shoe, being pivoted upon the recess in the end of the stem C, is freely adjusted. The teeth $f\ f$, &c., are then set so as to cover a greater or less extent of soil by extending or retracting the same or their stems *m m*, &c., within the slots *g g*, &c., of their respective arms *e e*, &c.; a wider radius of teeth being necessary when the soil happens to be very full of weeds. The sinking of the teeth *f f f*, &c., of the wheel D deeper in the soil at the side of the wheel furthest from the corn-hill gives the proper rotation to the same, at the same time that they throw out of the soil all weeds, &c., and thoroughly stir and pulverize the soil, which latter, if necessary, may be thrown back by a following-shovel, B', on the same beam.

What I claim as my invention is—

1. The wheel D having arms *e* provided with slots *g*, in combination with teeth *f*, so as to render the latter adjustable, substantially as and for the purpose set forth.

2. The spindle *d* with shoe *a*, provided with pivotal rib *z* and slot *k*, in combination with wheel D, bolt *c*, and stem C, substantially as and for the purpose set forth.

In testimony that I claim the foregoing rotary-cultivator attachment to straddle-row corn-cultivators I have hereunto set my hand this 2d day of September, A. D. 1872.

CHARLES N. POUNDSTONE.

Witnesses:
 JOHN M. POUNDSTONE,
 C. S. C. CRANE.